US008630415B2

(12) United States Patent
Pourzandi et al.

(10) Patent No.: US 8,630,415 B2
(45) Date of Patent: Jan. 14, 2014

(54) METHOD AND APPARATUS FOR AUTHENTICATION SERVICE APPLICATION PROCESSES DURING SERVICE REALLOCATION IN HIGH AVAILABILITY CLUSTERS

(75) Inventors: Makan Pourzandi, Montreal (CA); Frederic Rossi, Montreal (CA); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1145 days.

(21) Appl. No.: 12/020,185

(22) Filed: Jan. 25, 2008

(65) Prior Publication Data

US 2009/0190758 A1 Jul. 30, 2009

(51) Int. Cl.
*H04K 1/00* (2006.01)

(52) U.S. Cl.
USPC .......... 380/255; 726/27; 726/4; 713/153; 714/4.12

(58) Field of Classification Search
USPC .......... 380/255, 286; 370/389–392; 713/153; 726/4, 27
See application file for complete search history.

(56) References Cited

U.S. PATENT DOCUMENTS

| | | | |
|---|---|---|---|
| 7,197,660 B1 * | 3/2007 | Liu et al. | 714/4.12 |
| 7,266,715 B1 * | 9/2007 | Bazzinotti et al. | 714/4.4 |
| 7,712,143 B2 * | 5/2010 | Comlekoglu | 726/26 |
| 7,814,076 B2 * | 10/2010 | Sack et al. | 707/694 |
| 7,949,871 B2 * | 5/2011 | Randle et al. | 713/153 |
| 8,126,722 B2 * | 2/2012 | Robb et al. | 705/1.1 |
| 8,281,071 B1 * | 10/2012 | Vohra et al. | 711/114 |
| 8,321,925 B1 * | 11/2012 | Durgin et al. | 726/9 |
| 2002/0073354 A1 * | 6/2002 | Schroiff et al. | 714/4 |
| 2003/0133556 A1 * | 7/2003 | Naik et al. | 379/201.12 |
| 2005/0149684 A1 * | 7/2005 | Sankaran et al. | 711/162 |
| 2007/0094316 A1 * | 4/2007 | Rodriguez et al. | 707/205 |
| 2007/0171921 A1 * | 7/2007 | Wookey et al. | 370/401 |
| 2007/0245167 A1 * | 10/2007 | De La Cruz et al. | 714/4 |
| 2007/0255813 A1 * | 11/2007 | Hoover et al. | 709/223 |
| 2008/0059797 A1 * | 3/2008 | Tokuno et al. | 713/171 |
| 2008/0152151 A1 * | 6/2008 | Pourzandi et al. | 380/286 |
| 2008/0263390 A1 * | 10/2008 | Baba et al. | 714/4 |
| 2009/0164782 A1 * | 6/2009 | Pourzandi et al. | 713/168 |
| 2010/0146592 A1 * | 6/2010 | Gamare et al. | 726/4 |
| 2012/0254607 A1 * | 10/2012 | Chittigala et al. | 713/150 |

OTHER PUBLICATIONS

M Bechler, Cluster based security architecture for Ad Hoc Networks, 2004, IEEE, vol. 4, pp. 1-11.*

(Continued)

*Primary Examiner* — Nathan Flynn
*Assistant Examiner* — Viral Lakhia (57) ABSTRACT

A method and communication node for providing secure communications and services in a High Availability (HA) cluster. The communication node comprises an Operating System (OS) that detects an unavailability of a first service application process and switches a second service application process from the first state to the second state, the second service application being selected for taking over service currently provided from the first service application process, the first state and the second state each being associated to a set of rights in the cluster. The OS generates a private key for the second service application process based on its second state. The set of rights associated to the second state allows the OS to replace the first service application process with the second service application process for providing secure communications between the second service application and other service application processes in the HA cluster.

20 Claims, 5 Drawing Sheets

(56) References Cited

OTHER PUBLICATIONS

J.S. Chase, Dynamic virtual clusters in a grid site manager, Jun. 2003, IEEE, vol. 12, pp. 1-11.*
Pourzandi, M et al.: "Clusters and Security: distributed security for distributed systems"; Cluster Computing and The GRID, 2005; CCGRID 2005; IEEE International Symposium on Cardiff, Wales, UK, May 9-12, 2005; Piscataway, NJ, USA, IEEE, vol. 1, May 9, 2005, pp. 96-104, XP010863595; ISBN: 978-0-7803-9074-4, p. 98-p. 101.
Pourzandi, M et al.: "A new architecture for secure carrier-class clusters"; Cluster Computing, 2002. Proceedings. 2002 IEEE International Conference on Sep. 23-26, 2002. Piscataway, NJ, USA, IEEE, Sep. 23, 2002, pp. 494-497, XP101621919; ISBN: 978-0-7695-1745-2, the whole document.
International Search Report for PCT application No. PCT/IB2009/050244 dated Apr. 2, 2009.

* cited by examiner

METHOD AND APPARATUS FOR AUTHENTICATION SERVICE APPLICATION PROCESSES DURING SERVICE REALLOCATION IN HIGH AVAILABILITY CLUSTERS

TECHNICAL FIELD

The invention relates to the authentication of service application processes in high availability clusters.

BACKGROUND

A cluster is a set of nodes, each with a unique identifier within the cluster, connected together by a communication network. The membership of the cluster changes as nodes join and leave the cluster. The Cluster Membership Service allows a service application process to retrieve information about the nodes and the membership. It also allows a service application process to register to receive notifications of membership changes as they occur, using callback functions in order to provide failover service and thus High Availability services for networks such as computer systems or communication networks having interconnected communication nodes or servers. For example, the Service Availability™ Forum (SAF) specifications provide high availability service and requirements of service continuity for end-users. Achieving service continuity means maintaining customer data and session state without disruption across switchover or other fault-recovery scenarios. The reader interested in more information relating to the SAF middleware standard specification and HA applications is referred to SAF AIS B 03, which is available at www.saforum.org/specification.

In a SAF cluster, HA services are distributed across the entire cluster and are provided to HA applications in a transparent manner. Such HA clusters operate by having redundant computers or nodes that are used to provide continuous service when system components fail. The service should not be interrupted; therefore a security domain should guarantee security without involving any interruption in the service availability. A service domain is the set of service application processes that are grouped together to provide a service for example cluster membership, security service, messaging service, event service or any others in the cluster.

There are active and standby service application processes. Often in HA systems, the process life cycle and availability are monitored in order to keep the high availability. This functionality is provided by some Availability Management service (for example AMF defined in [SAF-AMF]). In this model, each process registers to the Availability Management Framework (AMF) with a defined component name (this component name can be communicated to the process by the system management, e.g. UNIX type environment variable). This component name represents the process functionality in the service domain. The component name can be presented as an LDAP name format.

In case of failure of active service application processes the service needs to be switched over to the standby service application processes. Standby service application processes receive the information from active processes (for example check points) in order to be ready to provide functionality after failure of active processes. Since, an active service application process needs to be authenticated prior to be able to access and provide services in a service domain. A standby service application process, which takes over for a failed active service application process also needs to be authenticated in the cluster. However, in existing models the authentication of the standby service application process may take a long time and thus causing delay in the service continuation. Using a central authentication server for authenticating users also take a long period of time in HA standards. Not much has been done to avoid time delays during authentication of a standby service application process during a take over of the standby service application process for an active process in distributed systems.

SUMMARY

It is a broad aspect of the invention to provide a method for providing secure communications in a High Availability (HA) cluster. The method allow detecting an unavailability of a first service application process; switching a second service application process from a first state to a second state, the second service application being selected for taking over service currently provided from a first service application process, the first state and the second state each being associated to a set of rights in the cluster; generating a private key for the second service application process based on the second state of the second service application process. The set of rights associated to the second state of the second service application process allows the second service application process to replace the first service application process for providing secure communications between the second service application and other service application processes in the HA cluster as provided prior the detection of the unavailability of the first service application process.

It is another broad aspect of the invention to provide a communication node for providing services in a High Availability (HA) cluster of interconnected communication nodes. The communication node comprises an Operating System (OS) for detecting the unavailability of the first service application process and switching the second service application process from the first state to the second state, the second service application being selected for taking over service currently provided from the first service application process, the first state and the second state each being associated to a set of rights in the cluster. The OS comprises a private key generator (PKG) for generating a private key for the second service application process based on the second state of the second service application process. The set of rights associated to the second state of the second service application process allows the OS to replace the first service application process with the second service application process for providing secure communications between the second service application and other service application processes in the HA cluster as provided prior the detection of the unavailability of the first service application process.

BRIEF DESCRIPTION OF THE DRAWINGS

The foregoing and other aspects, features, and advantages of the invention will be apparent from the following more particular detailed description as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques. In order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

In order to enforce security of a service application process that switch over from a standby state to an active state and that requests resources or services to another service application process within the same cluster, there should be provided an apparatus and method for doing so. Thus other service application process can verify that a certain service application process is authorized to be in a certain state, e.g. "active". Since services are distributed across the entire cluster 100 and since they are provided to application in a transparent manner, exchanges of data between applications processes and SAF middleware processes, which can be any service application process in High performance computing cluster (HPC) or distributed applications implemented on a cluster like a web server farm that can be hacked by unauthorized processes or applications. For example a service application process may try to get access to privileged resources reserved to SAF middleware processes. A malicious process could attempt to disturb cluster operation by sending false information to other service application processes, etc. For that reason, whenever a service application process wishes to share resources or request resources from another service application process the requesting or sharing service application process must be authenticated in addition to the state of the requesting service application process. Thus, a malicious process may only "pretends" to fail. When a new process takes over, it will then be the case that the "failed" process still has a copy of the private key and may thus, at its choosing, fake messages, appearing to come from the "real" active process. To mitigate such threats, whenever the OS suspects that the cluster has been compromised by a malicious process of the above type, the OS revokes the public/private key of the process in question and issue a new one. This may cause some interruption/disturbance of the service but is necessary to maintain a high degree of system integrity and should only occur in exceptional cases.

Figure 1:
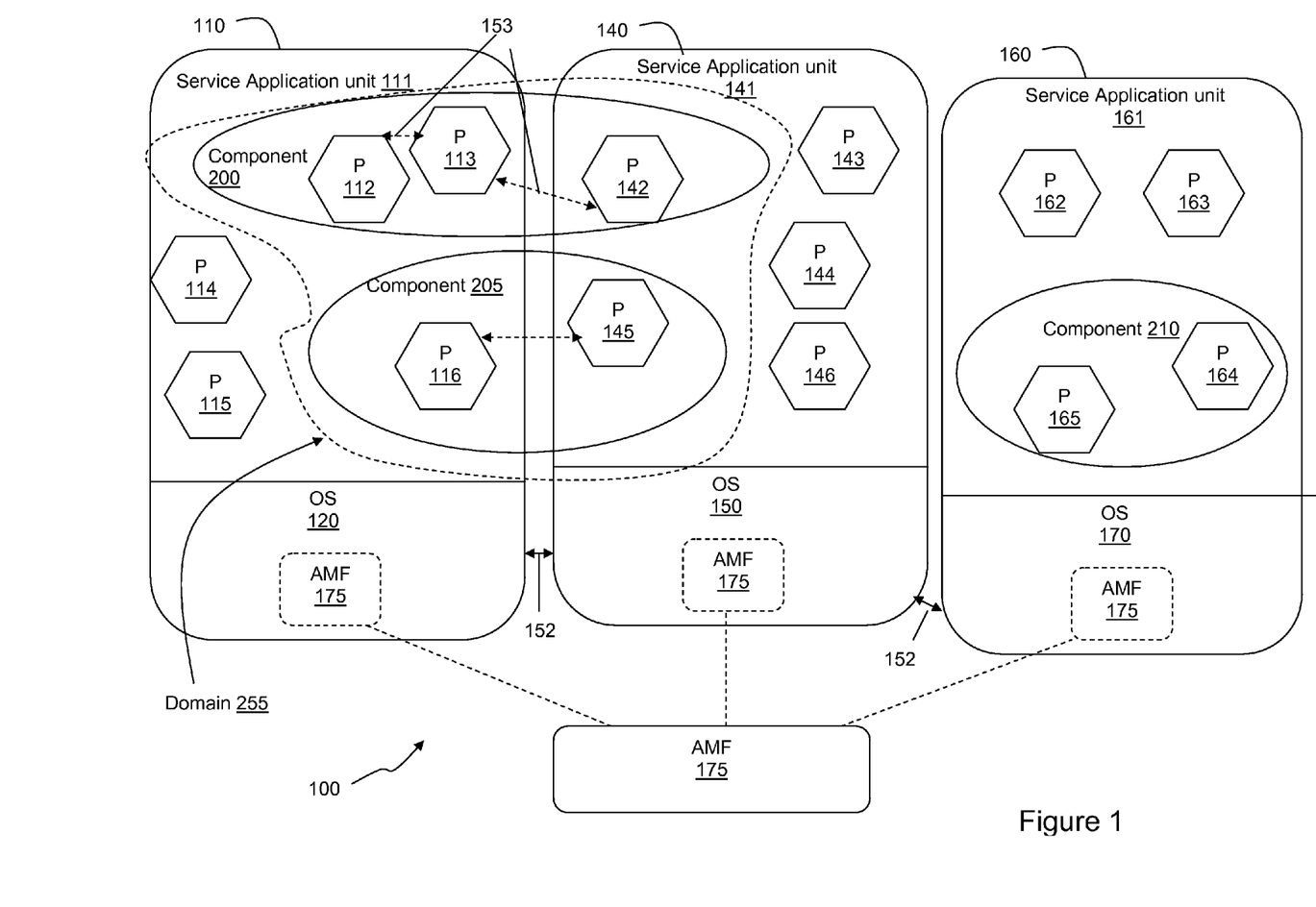
FIG. 1 is a schematic diagram illustrating a cluster of interconnected network elements in accordance to the invention.

Reference is now made to FIG. 1, which is a schematic diagram illustrating a cluster 100 of distributed communication nodes in accordance to the invention. The cluster 100 can be any distributed network such as a SAF cluster, HPC cluster, Grid cluster, etc. The communication nodes 110, 140 and 160 shown in FIG. 1 may be any communication nodes, computers or servers interconnected via a wired or wireless or radio connection 152 for sharing resources in order to provide a service or inter node communications such as database updates or service management for end users in a telecommunication network. The OS (e.g. 120, 150 or 170) manages HA applications in the communication nodes. The cluster 100 is not limited to the number of communication nodes shown on FIG. 1, but can be applied to a cluster that comprises more than the number of communication nodes shown on FIG. 1. The communication nodes 110, 140 and 160 each comprises a service application unit (111, 141 and 161) for storing service application processes. Communication nodes 110, 140 and 160 may comprise more then the number of service application processes shown on FIG. 1. A service application unit defines the environment where service application processes are located. The service application processes may be interconnected via a wired or wireless or radio connection 153. The connection 153 between service application processes can then allow the different service application processes to exchange information. FIG. 1 shows that the communication nodes comprise service application processes as listed in the following table:

| Communication node | Service application process |
| --- | --- |
| Communication node 110 | P112, P113, P114, P115, P116 |
| Communication node 140 | P142, P143, P144, P145, P146 |
| Communication node 160 | P162, P163, P164, P165 |

Each service application process is identified with a unique ID called a Process Biometric Identifier (PIB), which is generated using several parameters. The parameters for generating the PIB are, while not being limited to: a process identifier (PID) that identifies the service application process within the communication node 110, a node ID (NID) that uniquely identifies the communication node 110 in the cluster 100 and a Start Time (ST) parameter. The pair of parameters NID and PID can not define the service application process 112 in a unique way in the cluster 100. For example, the PID may be re-used after the service application process to which it is associated is terminated. The ST parameter avoids the problem related to the re-used PID values over time by the OS to reference new service application processes. The ST is defined as the time when a service application process is created based on the number of processor cycles elapsed from boot time of the OS. Since only one service application process PID can be created allocated at time "t" on node NID, the triplet {PID, NID, Start Time} provides the uniqueness of the PIB of a service application process in the cluster 100.

As shown on FIG. 1, there can be more than one secured domain per cluster. Each domain is associated to a Secret Value (SV) for encrypting a PIB for a service application process of the cluster 100. Therefore, with collaboration between the two OSes on two different nodes, it is possible to detect forged PIBs. For instance, the OS 120 on FIG. 2 stores a SV 244 that associated for each domain 223 (e.g. SVs 1, 2 and 3) in list 240.

Each service application process in a service domain has typically been assigned a unique component name in the domain and several service application processes may have been assigned the same component name in a domain. A component name defines a group of service application processes. A component name represents some functionality like web server in the service domain. A group represents the set of service application processes providing web server functionality. There is a unique active process and group of standby service application processes, ready to take over if called for.

Figure 2:
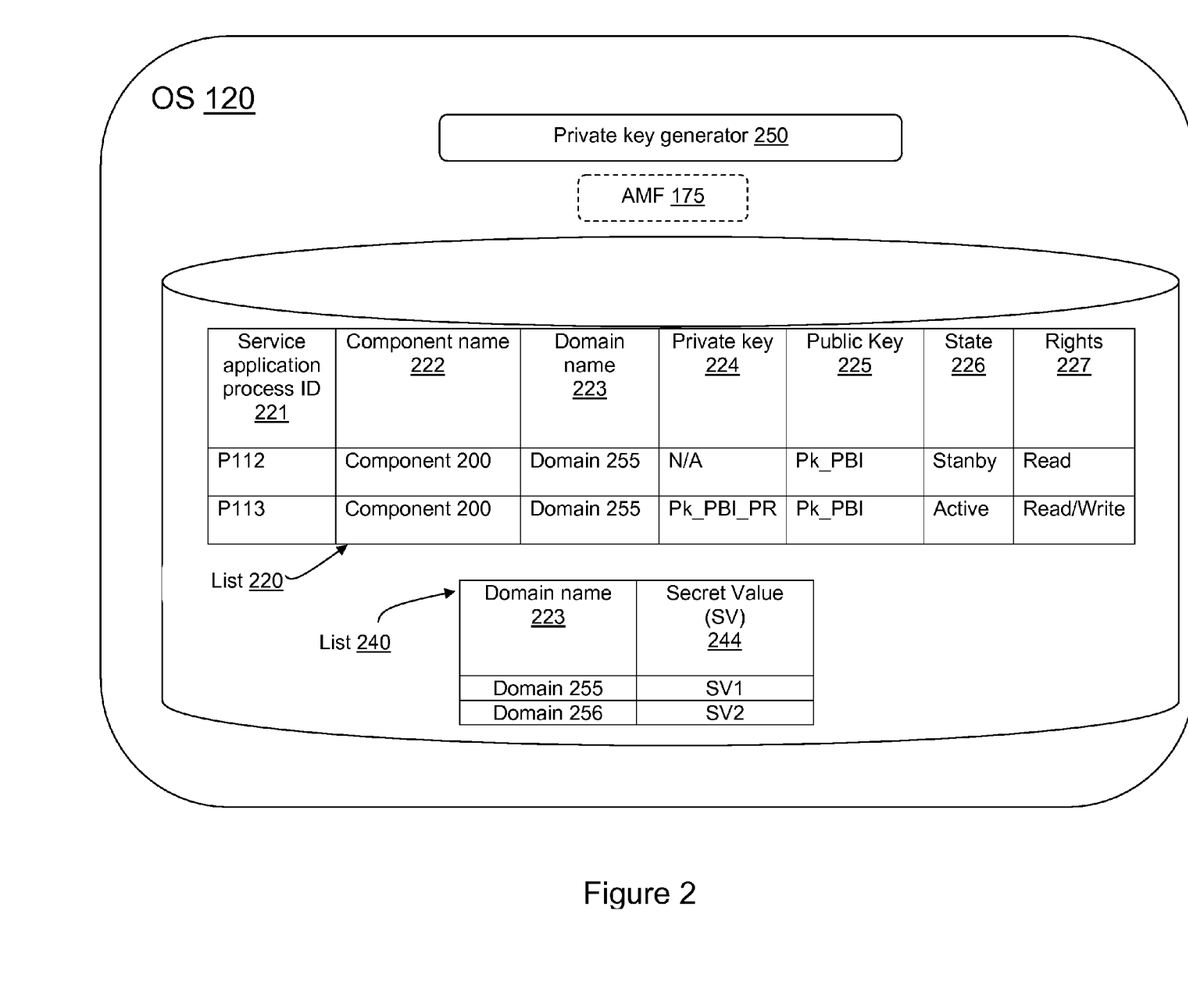
FIG. 2 is a schematic diagram illustrating an Operating System (OS) in accordance to the invention.

Each service application process in the group has a state (e.g. "standby" or "active") in the group. There is in general a number S of possible states. These states form a partition of the entire state-space, i.e. a service application process is at any given time in precisely one state. There are specific rights associated with each state of a service application process. For example, all service application processes in the group should be able to read the data (receiving messages), but only some service application processes being in predefined states should be able to write (send signed messages). In the current example the active state is associated to the right of sending signed messages to service application processes and the standby state is associated to the right of reading and receiving messages. The OS on different communication nodes of the cluster monitors different states of the processes in the group and switches over between different states when needed. For example, when an active service application process crashes, the OS switches over the service to a standby service application process, which then changes its state to an active state. The OS 120 stores a table 220, which lists service application process identifiers (ID) 221 of service application processes that are part of a particular domain. The table 220 also lists for each service application process: a component name 200 (e.g. component name 200), a domain name 223 (e.g. domain 255), a private key string or format 224, a public key 225, a state 226 and a set of rights 227 associated to each state 226. For example, an active state includes the rights allowing a service application process to send signed or encrypted messages to other service application processes and to receive or read messages from other service application processes in the cluster 100 and a standby state includes the rights allowing a service application process to receive or read messages from other service application processes in the cluster 100. As mentioned before and as it is further described, the states are not limited to an active state of a standby state. Thus, a set of rights is configurable for any given state and this depending on the state of a given service application process. OSes 120 and 150 and 170 store the same tables 220 and 240, which can be updated when a change is made to the cluster 100. The OSes 120, 150 and 170 can also determine which domain a service application process belongs to based on its characteristics such as based on the parameters of a service application process. These different SVs are defined at cluster level and are securely stored in each communication node's OS in the cluster 100. The OS is in charge of keeping those SVs and never reveals the SVs to service application processes. The SV is used based on which secured domain the service application process belongs to. Then, the PIB generation can be easily extended to support several secured domains.

When the service application process 112 is created at the OS 120 level, the OS 120 generates a unique identifier (ID) for identifying and authenticating service application process 112. The unique ID of a requesting service application service application process (e.g. 112) is then used when the service application process 112 requests resources or services to another service application process (e.g. process 122). When a standby service application process takes over the service from a failed service application process, an authentication of the state has to be performed. Thus, the OS uses a Private Key Generator (PKG) 250 such as an Identity Based Cryptography.

The PKG 250 schema is the entity in charge of generating pairs of private and public keys for different service application processes in the cluster 100. The PKG 250 can use any private key generator scheme such as an Identity Based Cryptography (IBC) having the property that any string can serve as a public key. This is in contrast to conventional public key schemes where only strings having "meaning" as "mathematical objects" can be used. The PKG 250 is used to create public keys which encode "component name", the "domain" and the process "state". Thus no "certificate" distribution is needed. Using the PKG 250 avoids any interruption in service availability and allows the OS 120 to rapidly distribute authentication keys (e.g. private key) to a standby service application process which takes over for a failed active service application process. Thus, if an active process crashed and the service is switched over to a standby service application process, other processes in the service domain may continue the secure communication with this re-incarnation of the active process, i.e. the standby service application process now being the active service application process, without any need for re-negotiating, receiving new keys or redistributing old keys.

The private key generator scheme at the PKG 250 accelerate the distribution of authentication keys or private keys because the local OS of the standby service application process can generate the private key for the crashed active process from the master private key and its public key without need for message exchange with other OSes, i.e. since the value of the public key is completely predictable (depends only on process/domain "name" information), the corresponding secret keys could be "prepared" by the OS but handed out only when needed. It is possible to allow also standby service application processes to have a public key and the associated private key. With this, the cluster allows a standby service application processes to write (e.g. send message). The public key can be in the form of Public_key_PIB=<Component name, security domain name, state in that domain>. Then we can distinguish a write operation coming from a stand-by process from a write by active processes. In general, in a system with S different states, the state information can be encoded in the public key and "writes" could be securely mapped to the state of the writing process. In addition, they can verify and determine that this state is true in the appropriate security domain.

PKG's master private key and public key pair are created upon initialization of the cluster 100. All OSes on nodes of the cluster share the same master key pair. (These keys may preferably be handled by secure, trusted hardware, e.g. TCG style defined at www.trustedcomputinggroug.org). Therefore, Oses can generate the same cryptographic identity (i.e. private/public key) for a given string. Each OS is in charge of creating public/private keys pairs and sending private keys to different service application processes in its local node after successful authentication of those processes. The authentication is extended to include the service domain which the service application process belongs to, functionality and the state of the process. The private key sent to the service application process corresponds to the service domain of the service application process, functionality and state in the service domain. The private/public keys are further used to validate (authenticate/authorize) the actions/commands for each process according to its state.

The OS on different communication nodes takes care of switching the execution flow from one process on states to another process in the cluster in the same state in the same group. Any execution flow takes place in the same state which the execution began in. More precisely, a given service application processes in the same state has the same cryptographic ID (public/private key). For example, on FIG. 1, the component name 200 may be a component name identifying a web server (e.g. active process P113) and the component 205 or 210 may be a component for a streaming server, and thus the services application the "web server" service application processes (e.g. active process P145) do not have the same ID as the "streaming server" process, even if they are both active.

FIG. 1 gives an example on how access can be provided to a standby service application process 112 that switches from a standby state to an active state in accordance to a first embodiment of the invention. This example is better described with reference made to FIG. 3, which is a flow chart of a method for authenticating a standby service application process that switches over for providing services of a failing active service application process. At step 302, the OS 115 detects a failure of service application process 122. Thus connection 152 between the active service application process 122 and service application process 113 is terminated. In order to assure service continuity and high availability of the service, the OS 115 switches over the state of the service application process 112 from a first state (e.g. standby) to a second state (e.g. active) and update the list 220 (step 306). Upon a switch over between the active service application process and the standby service application process, an Availability Management Framework (AMF) 175 choose one of the standby processes (of the cluster or same communication nodes) to become active.

Figure 4:
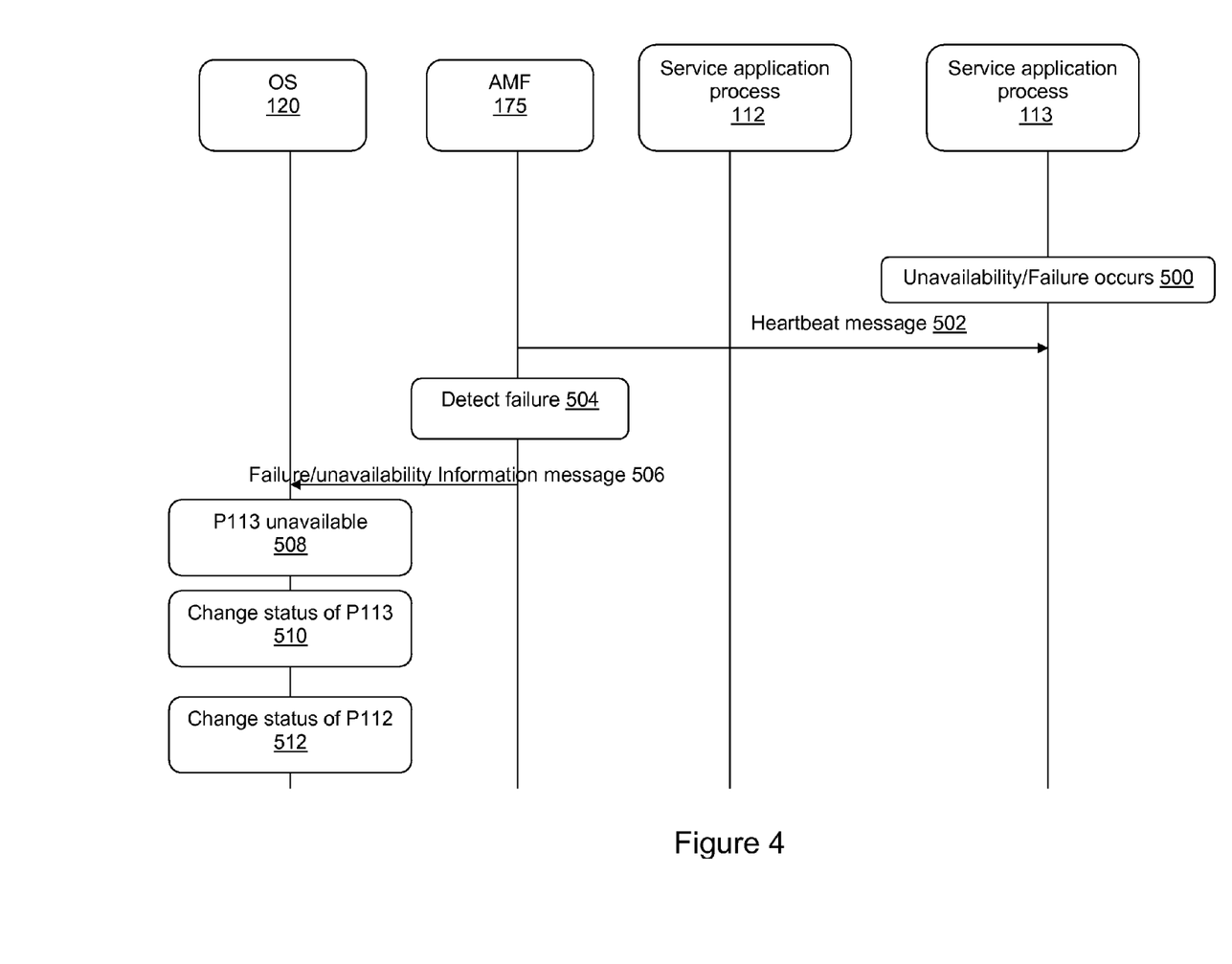
FIG. 4 is a flow of message that occurs at a communication node level, where the state of a service application process is changed by an OS.

Reference is now made to FIG. 4, which is a method for detection of a failed/unavailable service application process and a flow of messages that occurs at a communication node level between the AMF 175, an OS (e.g. OS 120), when the state of a service application process (e.g. 112 and 113) is changed. The example is given for service application process which is active when a failure occurs (step 500). The AMF 175, which sends heartbeat messages 502 from time to time to service application processes in the cluster, detects that the service application process 113 is unavailable (step 504). The OS 120 detects that the service application process 113 is unavailable when receiving failure/unavailability information message 506 from the AMF 175 (step 508). The OS 120 then changes the status of service application process 113 from active to standby (step 510) and changes the status of service application process 112 from standby to active (step 512).

This re-incarnation of active service application process, can now obtain the previously used private key by the ex-active service application process. For other service application processes, reading messages in the security domain there is no change as the same private key is used for signing messages. The AMF 175 can be part of the OS of different nodes of the cluster 100, or a separate user level application or a mixed implementation of user space and OS. In all cases, AMF 175 informs the local OS about the state change for each service application process. This is done for relating the permissions and rights of each service application process in the HA cluster 100 change and the state of the service application. The AMF 175 can be co-located to the OS of different communication nodes of the cluster 100. Therefore, the OS knows about the active and standby state for different service application processes.

Figure 3:
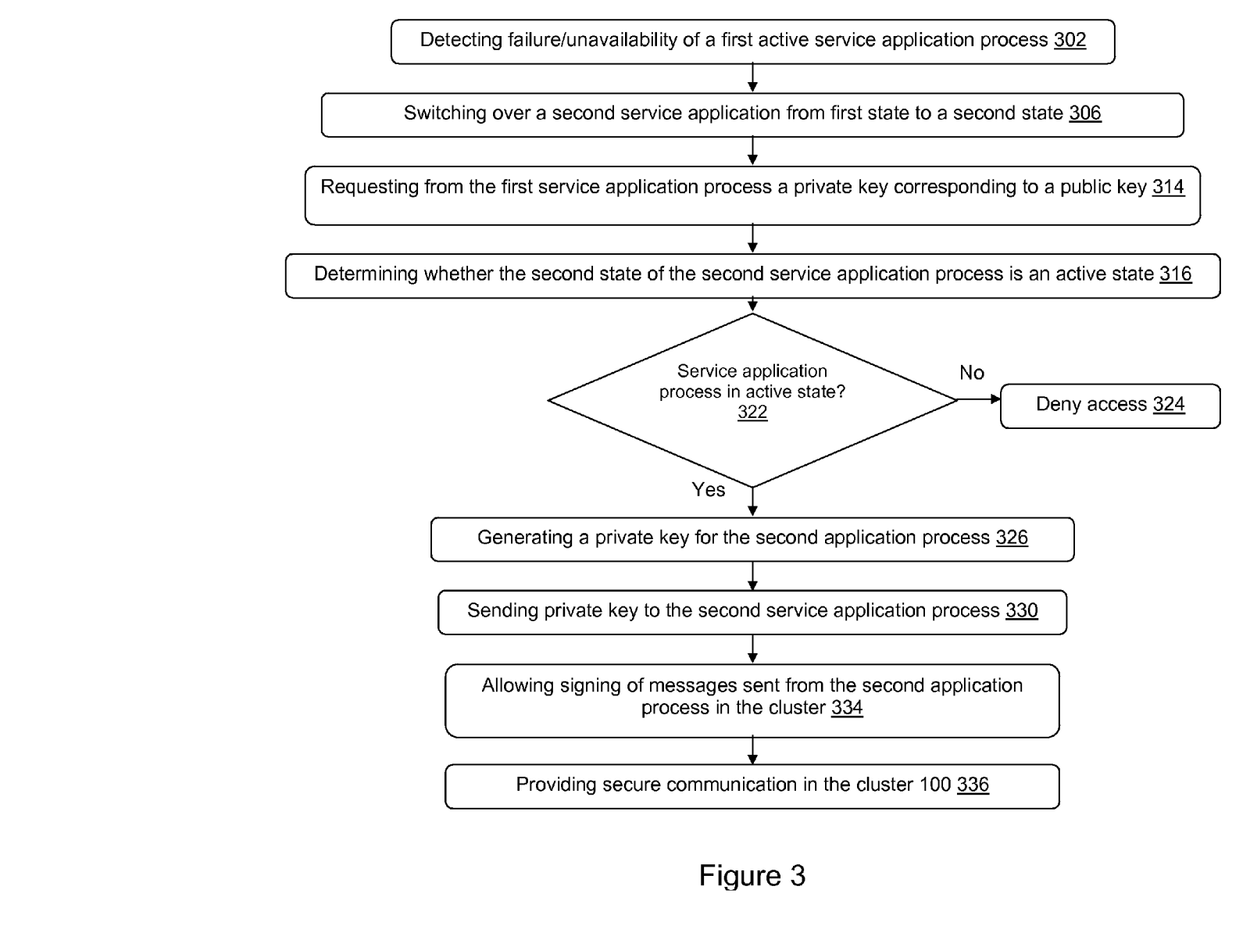
FIG. 3 is a flow chart illustrating the steps of a method for authenticating a standby service application process that switches over for providing services of a failing/unavailable active service application process.

At step 314, the service application process 112 now in active state in the service domain 101 asks for the private key corresponding to PubKeyA from the OS 120 (this public key and its private key are assigned to process 122). The public key can be in the form of Public_key_PIB=<Component name, security domain name, state in that domain>.

The OS 120 determines whether the service application process 112 is still in active state for avoiding the sending of a private key to a non-active (or possibly malicious) service application process (step 316). If the service application process is not in active state (step 322), the access is denied to the service application process 112 and a private is not generated for that service application process 112 (step 324). After positively determining that the service application process 112 is in active state (step 322), the OS 120 generates or retrieves from a set of pre-computed information and a private key corresponding to the public key (e.g. PubKeyA) of the service application process 112 (step 326). The private key can be generated using a call to the PKG 250 e.g. a getMyPrivateKey(private_key_struct) message. This call only returns the private key associated with the requesting service application process component name in the service domain, state and service domain. It returns an error code for service application processes on standby state and thus avoiding distribution of the private key to unauthorized service application process. The OS 120 further sends the private key to the service application process 112 (step 330). This operation allows the service application process 112 to provide services in replacement of the service application 113.

The service application process 112 uses this private key corresponding to the public key PubKeyA for signing messages before sending them to other service application processes (step 334). This signing may be applied to all or alternatively only to some selected "critical" messages. The receiving service application processes 113 can then validate these signatures having the public key "PubKeyA", which is encoded by the local OS. In particular, using the PubKeyA, the validation of the signature provided by service application process 112, allows a service application process that interacts with the service application process 112 to verify and determine, with using of the local OS and further table 220, the component name 220, and the state 226 of the service application process in addition to its security domain 223, which are part and encoded in the public key. Therefore, the signature authenticates the active state of the sending process, the component name and its service domain name and thus provides secured communications in the cluster 100, which allows exchange of signed messages, integrity and/or confidentiality of messages exchanged between processes inside the service domain, encrypted messages or information, etc. (step 336). The standby service application processes can not send valid messages in their security domain, even though they have an active state in another security domain. Furthermore, they can not sign messages sent to a security domain with a private key valid for another security domain. Thus, they can send messages with an inappropriate private key, but they the messages will not be accepted by the receivers.

Figure 5:
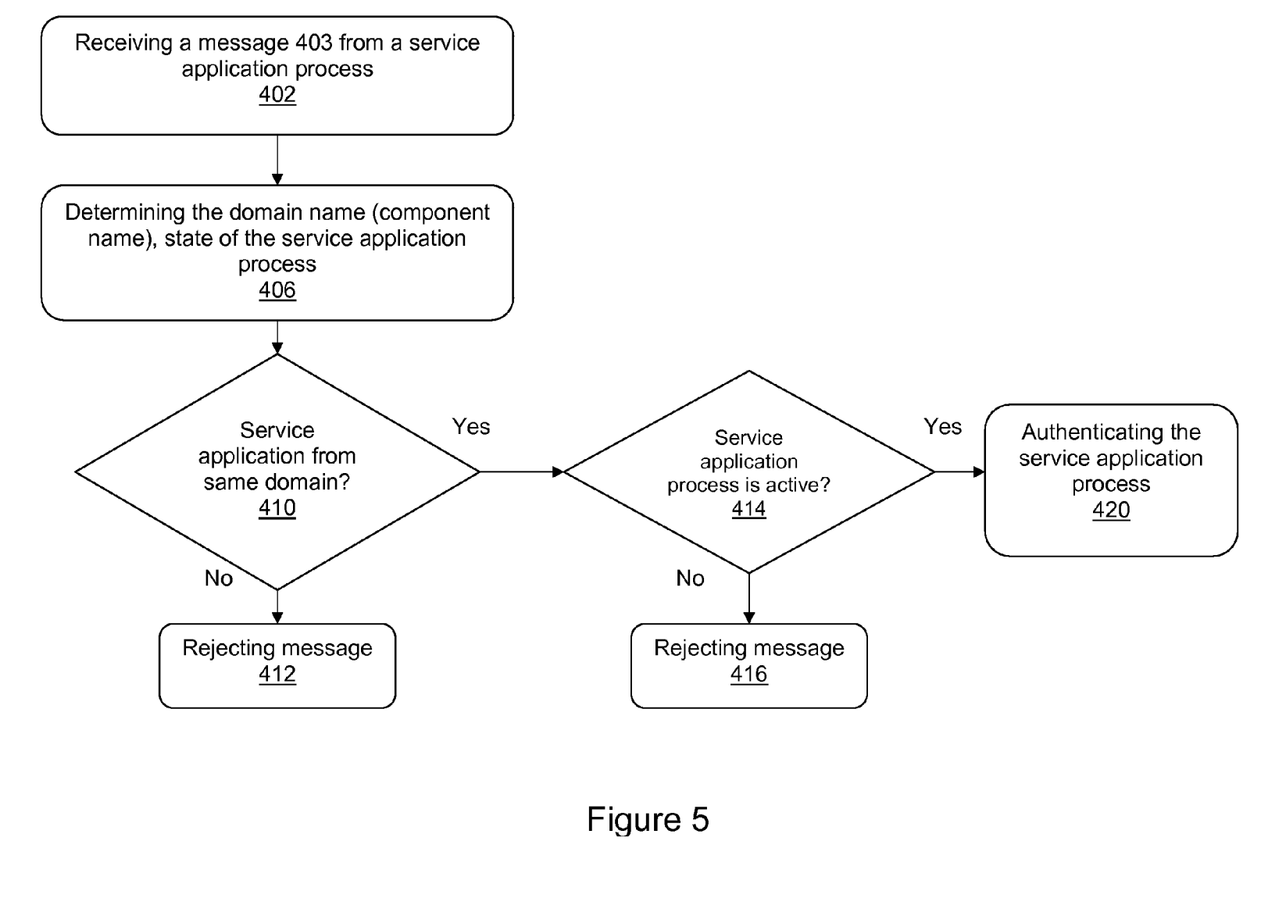
FIG. 5 is a flow chart illustrating the steps of a method for authenticating a standby service application process that switches over for providing services of a failing/unavailable active service application process.

Reference is now made to FIG. 5, which is a flow chart of a method for further enhancing authenticating a standby service application process that switches over for providing services of a failing active service application process by also using encryption. The method starts at step 403 where a service application 113 receives a message from another service application (e.g. service application 112) in the cluster. The message can be a request for services or for sharing information between service application process 113 receives the message from another service application process 112. Following the reception of the message, the receiving service application process 113 determines the component name 220, the domain name 223, and the state 226 of the service application process 112 (step 406). The service application process 113 determines that it needs to decrypt the received message. For doing so, a session key is directly deducted from the SV of the secured domain. Any session key derivation algorithm can be used to do so, for example based on sha256, sha512. In the following to ease the writing we assume using sha256. session_key=sha256(domain_Secret||nonce). Nonce is a random value, which is used to mitigate replay attacks and regenerate session keys over time. Other hashing function or algorithm, while not being limited to the following, SHA-224, SHA-256, SHA-384, SHA-512, and MD5, as defined in RFCs 3174, 4634 and 1321, which are published by the IETF (www.ietf.org), can be used.

The session key is obtained through a call to the OS by service application processes which belong to that service domain. The local OS provides a process only with the session key of the service domain which it belongs to. The process will use this session_key to encrypt and possibly also integrity protect messages before sending it or to decrypt and possibly also verify integrity of messages when receiving it. All service application processes (active or standby) members of the security domain can get this session key after a successful verification by the local OS that they belong to the service domain. Using encryption by the session key, only processes being member of a service domain can read the messages sent to peers in that domain.

If at step 410, the service application process 112 and the service application process 113 are from the same domain the authentication operation continues at step 414. In the contrary the service application process 113 rejects the request message (step 412). At step 414, the service application process 113 determines whether the service application process 112 is active. If at step 414, the service application process 112 is active then the service application process 112 is authenticated and the request message is allowed and accepted (step 420). In the contrary the service application process 113 rejects the request message (step 416).

It can be understood that some messages and therefore some parameters sent between communication nodes of the cluster 100 are omitted for clarity reasons. More particularly, it should also be understood that FIGS. 1 and 2 depict a simplified cluster network 100, and that many other communication nodes have been omitted for clarity reasons only. Hence, the cluster 100 may comprise more than the number of communication nodes present in the Figures. Furthermore, the service application processes and the domains in the cluster 100 are not limited to the number illustrated on Figures. The example of the switch over of a state from "standby" to "active" and the authentication operation for a service application process was described for one service application process 112. However, it can be understood that many service application processes can simultaneously be authenticated and their state can be switched over in the cluster 100.

While the invention has been particularly shown and described with reference to the preferred embodiments thereof, it will be understood by those skilled in the art that various alterations may be made therein without departing from the scope of the invention.

The invention claimed is:

1. A method for providing secure communications in a High Availability (HA) cluster, the method comprising the steps of:
    detecting an unavailability of a first service application process associated with a service, the first service application process being further associated with a first key pair having a public key and a private key;
    selecting a second service application process to provide the service associated with the unavailable first service application;
    switching the selected second service application process from a first state associated with a first set of rights in the HA cluster to a second state associated with a second set of rights in the cluster providing authorization to replace the first service application; and
    generating a private cryptographic key for the second service application process based on the second state of the second service application process and the public key associated with the first service application process to create a second key pair, the second key pair being composed of the generated private cryptographic key and the public key, to enable secure communications between the second service application process and other service application processes in the HA cluster.

2. The method of claim 1, wherein the method further comprises the steps of:
    sending messages from the second service application process to a third service application, the messages being signed using the generated private cryptographic key of the second service application process; and
    determining whether the second service application process is from a same security domain and whether the second service application process is in an active state based on the public key of the second service application process, the public key encoding a component name, a state of the second service application process and a security domain of the second service application process.

3. The method of claim 2, wherein the method further comprises the steps of:
    rejecting a request message from the second service application process, if the second service application process is in a state that is different than an active state; and
    allowing the request message of the second service application process, if the second service application process is in an active state.

4. The method of claim 2, wherein the third service application process is a service application process in a standby state.

5. The method of claim 2, wherein the third service application process is a service application process in an active state.

6. The method of claim 1, wherein the step of generating further comprises the step of:
    determining whether the second state of the second service application is an active state;
    sending a request from the second service application process to an operating system (OS) of a communication node for obtaining a private key; and
    generating the private cryptographic key using a private key generator for generating pairs of private and public keys for the second service application process, the private cryptographic key corresponding to the public key of the second service application process.

7. The method of claim 1, wherein secure communications between the second service application process and other service application process are provided with signed messages sent from the second service application process to other service application processes, the signed messages being signed with the private key of the second service application process.

8. The method of claim 1, wherein the first service application process and the second service application process are located in the same security domain.

9. The method of claim 1, wherein the first service application process and the second service application process are part of the same component name.

10. A communication node for providing services in a High Availability (HA) cluster of interconnected communication nodes, the communication node comprising:
    a processor for detecting an unavailability of a first service application process associated with a service, the first service application process being further associated with a first key pair having a public key and a private key, for selecting a second service application process to provide the service associated with the unavailable first service application and for switching the selected second service application process from a first state associated with a first set of rights in the HA cluster to a second state associated with a set of rights in the cluster providing authorization to replace the first service application; and a private key generator for generating a private cryptographic key for the second service application process based on the second state of the second service application process and the public key associated with the first service application process to create a second key pair, the second key pair being composed of the generated private cryptographic key and the public key, to enable secure communications between the second service application process and other service application processes in the HA cluster.

11. The communication node of claim 10, wherein the communication node further comprises a memory including a table for listing a component name, a state and the security domain of the second service application process, component name, a state and the security domain of the second service application process being encoded in a public key of the second service application process.

12. The communication node of claim 11, wherein the second service application process sends messages to a third service application, the messages being signed using the generated private cryptographic key corresponding to the public key of the second service application process.

13. The communication node of claim 12, wherein the processor determines following the reception of a message at the third service application process, whether the second service application process is from a same security domain and whether the second service application process is in an active state based on a public key of the second service application process based on the public key of the second service application process.

14. The communication node of claim 13, wherein the processor rejects a sent message from the second service application process, if the second service application process is in a state that is different than an active state and allows the request message of the second service application process, if the second service application process is in an active state.

15. The communication node of claim 12, wherein the third service application process is a service application process in a standby state.

16. The communication node of claim 12, wherein the third service application process is a service application process in an active state.

17. The communication node of claim 10, wherein the processor further determines whether the second state of the second service application is an active state, receives from the second service application process a request for obtaining a private key, the private key corresponding to the public key of the second service application process.

18. The communication node of claim 10, wherein secure communications between the second service application process and other service application process are provided with signed messages sent from the second service application process to other service application processes, the signed messages being signed with the generated private cryptographic key of the second service application process.

19. The communication node of claim 10, wherein the first service application process and the second service application process are located in the same security domain.

20. The communication node of claim 10, wherein the first service application process and the second service application process are part of the same component name.

* * * * *